(12) United States Patent
Kim et al.

(10) Patent No.: US 10,473,980 B2
(45) Date of Patent: Nov. 12, 2019

(54) IN-PLANE SWITCHING MODE LIQUID CRYSTAL DISPLAY DEVICE COMPRISING AN IN-CELL RETARDER AND FIRST AND SECOND OPTICAL COMPENSATION FILMS

(71) Applicant: LG Display Co., Ltd., Seoul (KR)

(72) Inventors: JeongHwan Kim, Gyeonggi-do (KR); YongHak Park, Daegu (KR); JaeHyun Lee, Gyeonggi-do (KR); SooWon Hwang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 366 days.

(21) Appl. No.: 14/827,470

(22) Filed: Aug. 17, 2015

(65) Prior Publication Data

US 2016/0062166 A1 Mar. 3, 2016

(30) Foreign Application Priority Data

Aug. 28, 2014 (KR) .................. 10-2014-0113280

(51) Int. Cl.
*G02F 1/13363* (2006.01)
*G02F 1/1343* (2006.01)
(Continued)

(52) U.S. Cl.
CPC ........ *G02F 1/13363* (2013.01); *G02F 1/1337* (2013.01); *G02F 1/133512* (2013.01);
(Continued)

(58) Field of Classification Search
CPC ..... G02F 1/13363; G02F 2001/133531; G02F 2001/133633; G02F 2413/05; G02F 2413/06; G02F 2413/07

See application file for complete search history.

(56) References Cited

U.S. PATENT DOCUMENTS

2005/0128394 A1* 6/2005 Lee ................. G02B 5/3083
349/119
2007/0279553 A1* 12/2007 Yoda .................. G02F 1/13363
349/96

(Continued)

FOREIGN PATENT DOCUMENTS

| CN | 101762903 A | 6/2010 |
| CN | 101770114 A | 7/2010 |

(Continued)

OTHER PUBLICATIONS

Extended European Search Report dated Jan. 29, 2016, for corresponding European Patent Application No. 5178907.0.

(Continued)

*Primary Examiner* — Paul C Lee
(74) *Attorney, Agent, or Firm* — Morgan, Lewis & Bockius LLP

(57) ABSTRACT

An in-plane switching (IPS) mode liquid crystal display (LCD) device includes a liquid crystal display panel having a first substrate, a second substrate, and a liquid crystal layer between the first and second substrates; a second polarizer on an outer surface of the second substrate, the second polarizer having a second polarizing element; and an in-cell retarder on an inner surface of the second substrate, wherein the in-cell retarder compensates a light leakage in a front direction of the liquid crystal display panel.

18 Claims, 13 Drawing Sheets

(51) Int. Cl.
  *G02F 1/1335* (2006.01)
  *G02F 1/1337* (2006.01)
(52) U.S. Cl.
  CPC .. *G02F 1/133514* (2013.01); *G02F 1/133528* (2013.01); *G02F 1/133634* (2013.01); *G02F 1/134363* (2013.01); *G02F 2001/133531* (2013.01); *G02F 2001/133633* (2013.01); *G02F 2413/02* (2013.01); *G02F 2413/06* (2013.01); *G02F 2413/12* (2013.01)

(56) References Cited

U.S. PATENT DOCUMENTS

| | | | | |
|---|---|---|---|---|
| 2008/0284948 | A1* | 11/2008 | Koishi | G02B 5/3083 349/96 |
| 2009/0040439 | A1* | 2/2009 | Ohyama | G02F 1/133555 349/106 |
| 2009/0135343 | A1* | 5/2009 | Kitamura | G02B 5/3033 349/96 |
| 2010/0020284 | A1* | 1/2010 | Parri | G02F 1/13378 349/191 |
| 2010/0157207 | A1 | 6/2010 | Lee et al. | |
| 2010/0157208 | A1 | 6/2010 | Hanne et al. | |
| 2010/0165265 | A1 | 7/2010 | Moon et al. | |
| 2010/0188605 | A1* | 7/2010 | Hasegawa | G02B 5/3033 349/62 |
| 2011/0141407 | A1* | 6/2011 | Akao | G02B 5/201 349/96 |
| 2011/0255038 | A1* | 10/2011 | Chang | G02B 5/3083 349/96 |
| 2012/0099053 | A1* | 4/2012 | Kamoshida | G02F 1/13363 349/96 |
| 2013/0229588 | A1* | 9/2013 | Nishida | G02F 1/133634 349/33 |

FOREIGN PATENT DOCUMENTS

| | | |
|---|---|---|
| CN | 102455545 A | 5/2012 |
| WO | 2009037565 A2 | 3/2009 |

OTHER PUBLICATIONS

Chinese Office Action dated Jan. 2, 2017, issued in corresponding Chinese Application No. 201510530577.8.

* cited by examiner

LUMINANCE CONTROUR

IN-PLANE SWITCHING MODE LIQUID CRYSTAL DISPLAY DEVICE COMPRISING AN IN-CELL RETARDER AND FIRST AND SECOND OPTICAL COMPENSATION FILMS

CROSS-REFERENCE TO RELATED APPLICATION

Pursuant to 35 U.S.C. § 119(a), this application claims the benefit of earlier filing date and right of priority to Korean Application No. 10-2014-0113280, filed on Aug. 28, 2014, the contents of which is incorporated by reference herein in its entirety.

BACKGROUND OF THE DISCLOSURE

1. Field of the Disclosure

This specification relates to an in-plane switching (IPS) mode liquid crystal display (LCD) device, and more particularly, an IPS-mode LCD device and display device having in-cell retarder for compensating a light leakage in a front direction or a diagonal direction of the liquid crystal display panel.

2. Background of the Disclosure

As the interest in information displays and demands on the use of portable information media increase, researches and commercialization are focusing mainly on display devices which are light in weight and thin in thickness. Specifically, among such display devices, a liquid crystal display (LCD) device is a device for displaying an image using optical anisotropy of liquid crystals, and is widely applied to notebook computers or desktop monitors in view of its high resolution, high color rendering property and high image quality.

The LCD device roughly includes a color filter substrate as a first substrate, an array substrate as a second substrate, and a liquid crystal display panel between the color filter substrate and the array substrate.

Here, the color filter substrate includes a color filter having a plurality of sub color filters for rendering red (R), green (G) and blue (B) colors, a black matrix partitioning the sub color filters and blocking light transmitted through the liquid crystal layer, and a transparent common electrode applying a voltage to the liquid crystal layer.

The array substrate includes a plurality of gate lines and data lines that are arranged vertically and horizontally to define a plurality of pixel regions, thin film transistor (TFTs) as switching elements each formed at an intersection between the gate line and the data line, and pixel electrodes respectively provided on the pixel regions.

The thusly-configured color filter substrate and array substrate are assembled to each other in a facing manner, by use of a sealant which is provided along an outer edge of an image display region, thereby configuring the liquid crystal display panel.

Here, the assembling between the color filter substrate and the array substrate are achieved by a assembling key which is formed on the color filter substrate or the array substrate.

The aforementioned LCD device refers to a twisted nematic (TN) LCD device in which nematic liquid crystal molecules are driven to be perpendicular to a substrate. The TN mode LCD device has a disadvantage of a narrow viewing angle of about 90°, which results from a refractive anisotropy of the liquid crystal molecules, namely, results from that the liquid crystal molecules aligned in parallel to the substrate are aligned almost perpendicular to the substrate when a voltage is applied to a liquid crystal display panel.

Accordingly, an in-plane switching (IPS) mode LCD device with an improved viewing angle of 170° by driving liquid crystal molecules in a direction horizontal to a substrate. Hereinafter, the IPS-mode LCD device will be described in detail with reference to the accompanying drawings.

FIG. 1 is a planar view schematically illustrating a part of an array substrate of a general IPS-mode LCD device.

An LCD device actually has M×N pixels at intersections between N gate lines and M data lines. For the sake of brief explanation, one pixel will be exemplarily illustrated.

FIG. 2 is a sectional view of the array substrate illustrated in FIG. 1, taken along the line I-I'. Here, FIG. 2 illustrates a color filter substrate assembled the array substrate of FIG. 1.

As illustrated in FIGS. 1 and 2, a transparent array substrate 10 is provided with gate lines 16 and data lines 17 which are arranged in vertical and horizontal directions so as to define pixel regions. A thin film transistor (TFT) T as a switching element is provided on an intersection between the gate line 16 and the data line 17.

Here, the TFT T includes a gate electrode 21 connected to the gate line 16, a source electrode 22 connected to the data line 17, and a drain electrode 23 connected to a pixel electrode 18 through a pixel electrode line 181. Also, the TFT T further includes a first insulating layer 15a for insulation between the gate electrode 21 and the source and drain electrodes 22 and 23, and an active pattern 24 to form a conductive channel between the source electrode 22 and the drain electrode 23 in response to a gate voltage being supplied to the gate electrode 21.

For reference, a reference numeral 25 denotes an ohmic-contact layer to form an ohmic-contact between a source/drain region of the active pattern 24 and the source and drain electrodes 22 and 23.

Here, a common line 81 and a storage electrode 18s are arranged in parallel to the gate line 16 within the pixel region. Also, a plurality of common electrodes 8 and pixel electrodes 18, which generate a horizontal electric field 90 within the pixel region so as to switch liquid crystal molecules (not illustrated), are arranged in parallel to the data line 17.

Here, the storage electrode 18s overlaps a part of the common line 81 under the storage electrode 18s with the first insulating layer 15a interposed therebetween, so as to form a storage capacitor Cst.

The transparent color filter substrate 5 includes a black matrix 6 to prevent a light leakage at a region of the TFT T and between the gate line 16 and the data line 17, and a color filter 7 to render red, green and blue colors.

Alignment layers (not illustrated) which decide an initial alignment direction of the liquid crystal molecules are formed respectively on surfaces of the array substrate 10 and the color filter substrate 5 which face each other. Polarizers (or polarizing plates) (not illustrated) are arranged on outer surfaces of the array substrate 10 and the color filter substrate 5, respectively, in a manner that light transmission axes thereof are perpendicular to each other.

The general in-plane switching (IPS) mode LCD device has an advantage of having an improved viewing angle in that the common electrode 8 and the pixel electrode 18 are arranged on the same array substrate 10 to generate a horizontal electric field 90 which is parallel to the array substrate 10, and the liquid crystal molecules are aligned to be parallel to the horizontal electric field 90.

However, there is a light leakage in a diagonal direction in the general IPS-mode LCD device when a black state is formed, and thereby a contrast ratio is lowered.

FIGS. 3A and 3B are exemplary views illustrating brightness and viewing angle characteristics in a black state, in a general IPS-mode LCD device.

Here, FIG. 3A illustrates simulation results of the brightness and viewing angle characteristics in the black state, and FIG. 3B illustrates a measurement result of the brightness and viewing angle characteristics in the black state.

FIGS. 3A and 3B exemplarily illustrate the brightness and viewing angle characteristics in the black state when a 0-RT (triacetylcellulose with thickness-direction retardation value Rth close to 0 nm) film is applied between a polyvinyl alcohol (PVA) layer of the polarizer and a liquid crystal layer.

A light absorption axis of a lower polarizer is aligned to be orthogonal to a light absorption axis of an upper polarizer, and an optical axis of the liquid crystal layer is parallel to the light absorption axis of the lower polarizer.

As illustrated in FIGS. 3A and 3B, there are much light leakages at angles of 45°, 135°, 225° and 315°, which correspond to diagonal directions of the liquid crystal display panel, in the black state, and thereby brightness increases. Accordingly, the contrast ratio of the IPS-mode LCD device is lowered.

However, this problem does not result from the IPS-mode LCD device but results generally from using polarizers. That is, an IPS mode, like the IPS-mode LCD device, can decide an initial alignment state of liquid crystals such that a polarized state of light cannot be affected by the liquid crystals in all directions. In this instance, the light leakage results from the polarizers.

FIG. 4A schematically illustrates light transmission axes of the upper and lower polarizers, which are orthogonal to each other, when viewed from a front direction.

FIG. 4B schematically illustrates light transmission axes of the upper and lower polarizers, which are orthogonal to each other, when viewed in the diagonal direction.

Here, a solid line illustrated in FIGS. 4A and 4B indicates a direction of the light absorption axis of the upper polarizer, and a dashed line indicates a direction of the light absorption axis of the lower polarizer.

Referring to FIGS. 4A and 4B, even if the light absorption axes of the polarizers are orthogonal to each other, the orthogonality of the two polarizers is broken according to a viewing angle. That is, as illustrated in FIG. 4A, when the liquid crystal display panel is viewed from the front direction, the light absorption axes of the upper and lower polarizers form an angle of 90° so as to implement a black state.

However, as illustrated in FIG. 4B, when the liquid crystal display panel is viewed in the diagonal direction, the light absorption axes of the upper and lower polarizers form an angle over 90°. Accordingly, the orthogonality of the two polarizers is broken and thereby the light leakage is caused.

As such, the IPS-mode LCD device employs the way of applying the horizontal electric field to the liquid crystal layer. Accordingly, the IPS-mode LCD device exhibits the less change in phase retardation of the liquid crystals according to a voltage, and an excellent viewing angle resulting from that optical axes of the upper and lower polarizers remain perpendicular to each other in horizontal and vertical directions. However, the light leakage is caused in the diagonal direction in which the orthogonality of the two polarizers is broken and thereby image quality is lowered.

Meanwhile, even when the liquid crystal display panel is viewed from the front direction, the light leakage may be caused due to external stress applied to the liquid crystal display panel because a glass substrate obtains refractive anisotropy due to interference between a structure supporting the liquid crystal display panel and the liquid crystal display panel and stress applied thereto during an array process and a color filter process.

Glass having ideal anisotropy generates a retardation value (Re=β×t×F) in proportion to stress F applied during a fabricating process, and accordingly obtains refractive anisotropy. Here, β and t denote a photoelastic coefficient and thickness of the glass, respectively.

SUMMARY OF THE DISCLOSURE

Accordingly, the present invention is directed to an in-plane switching (IPS) mode liquid crystal display (LCD) device and display device that substantially obviates one or more of the problems due to limitations and disadvantages of the related art.

An object of the present invention is to provide an in-plane switching (IPS) mode liquid crystal display (LCD) device and display device, capable of preventing a light leakage in front and diagonal directions in a black state.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of this specification, as embodied and broadly described herein, an in-plane switching (IPS) mode liquid crystal display (LCD) device comprises a liquid crystal display panel having a first substrate, a second substrate, and a liquid crystal layer between the first second substrates; and an in-cell retarder on an inner surface of the second substrate. The in-cell retarder may be configured to compensate a light leakage in a front direction of the liquid crystal display panel. In another aspect, a display device comprises a liquid crystal display panel having a first substrate, a second substrate, and a liquid crystal layer between the first and second substrates; a second polarizer on an outer surface of the second substrate, the second polarizer having a second polarizing element and at least two optical compensation films between the second substrate and the second polarizing element. Thus, a viewing angle in a diagonal direction of the liquid crystal display panel can be enhanced. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure. In the drawings.

DETAILED DESCRIPTION OF THE DISCLOSURE

Figure 1:
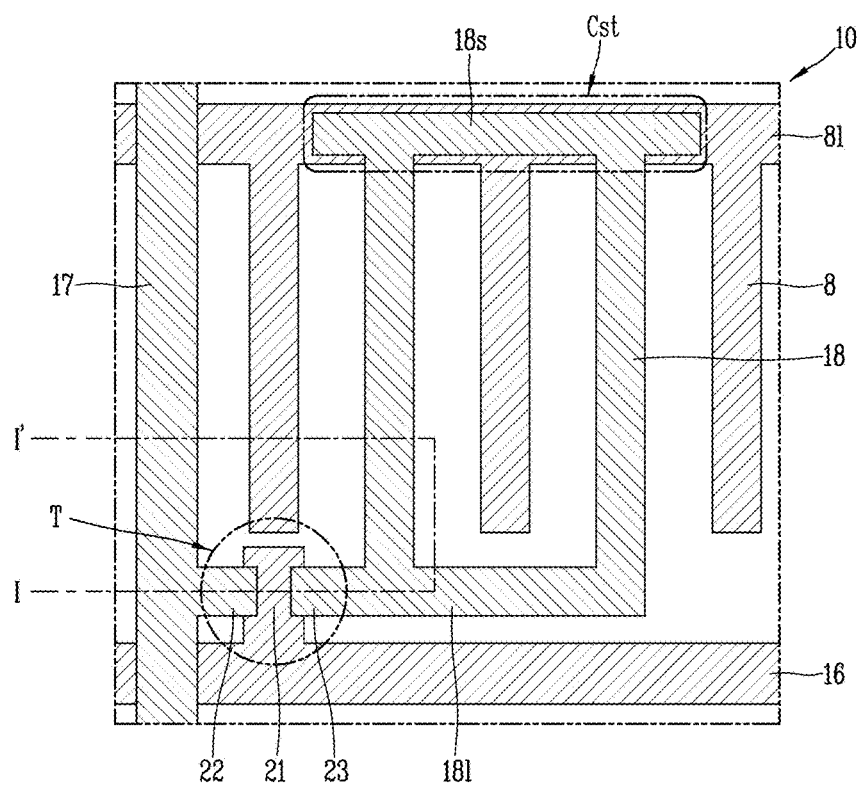
FIG. 1 is a planar view schematically illustrating a part of an array substrate of a general IPS-mode LCD device.
Figure 2:
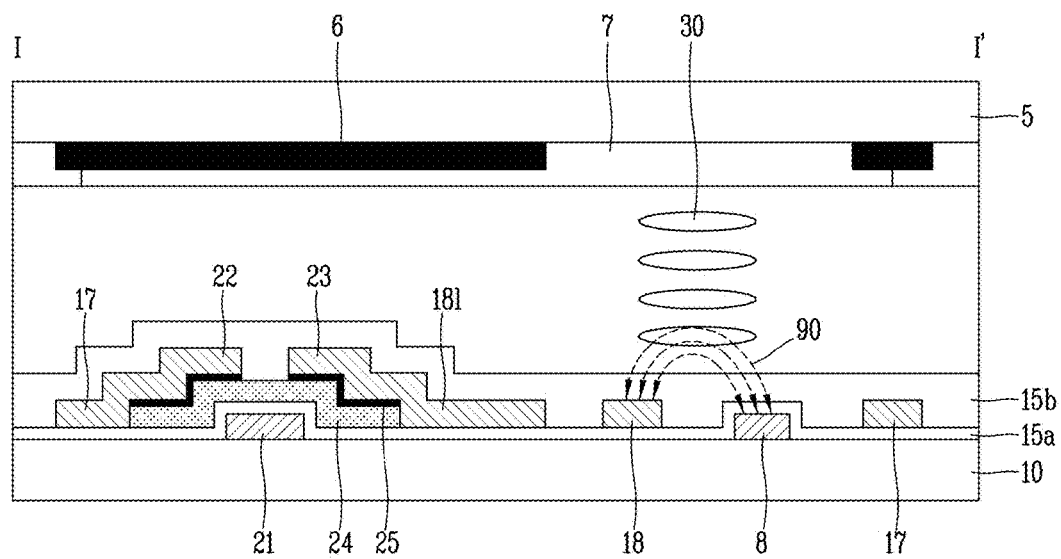
FIG. 2 is a sectional view of the array substrate illustrated in FIG. 1, taken along the line I-I'.
Figure 3A:
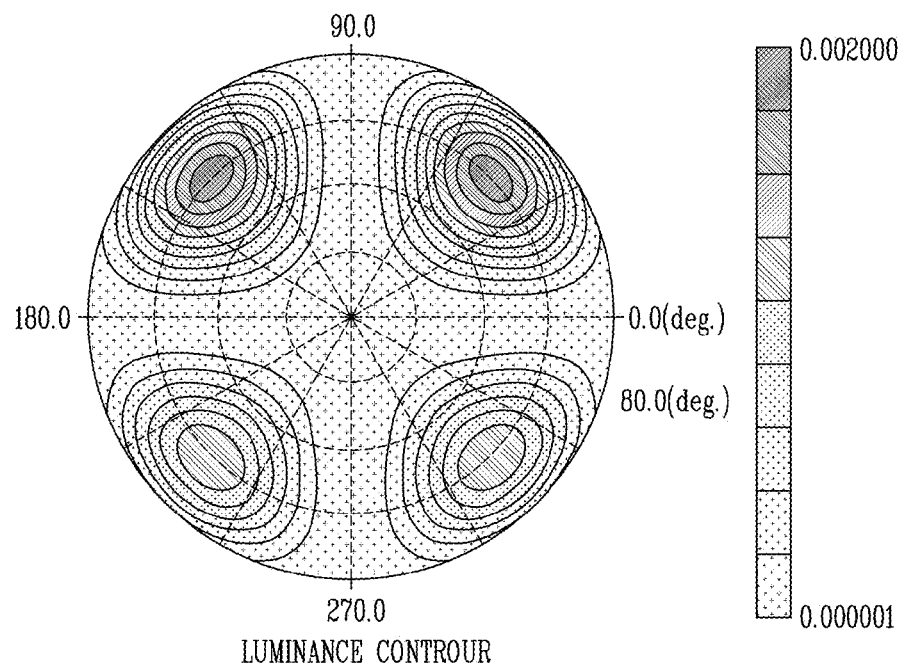
FIGS. 3A and 3B are exemplary views illustrating brightness and viewing angle characteristics in a black state, in a general IPS-mode LCD device.
Figure 3B:
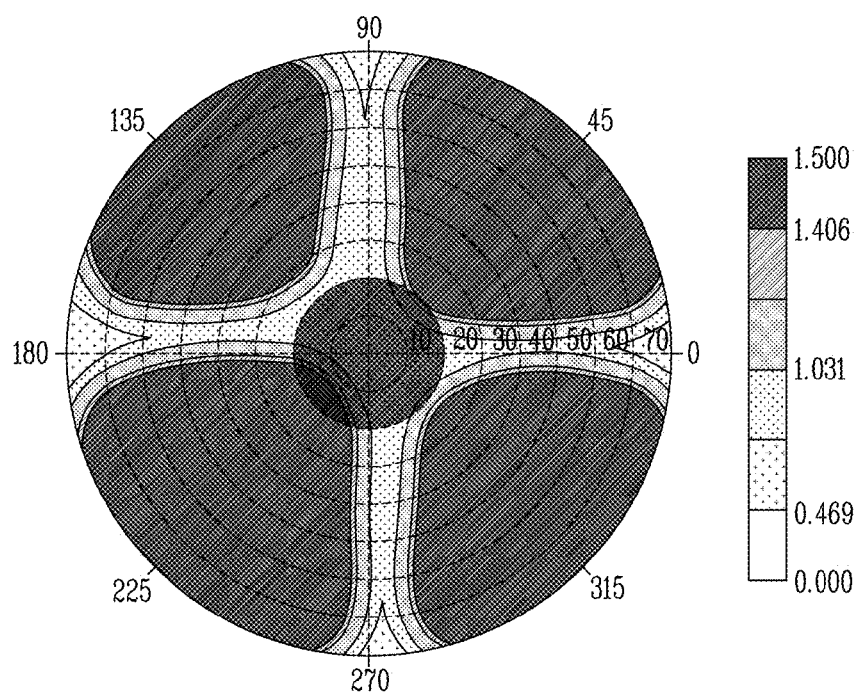
Figure 4A:
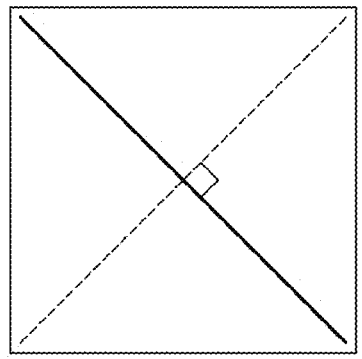
FIG. 4A is a schematic view illustrating light transmission axes of upper and lower polarizers, which are orthogonal to each other, when viewed from a front direction.
Figure 4B:
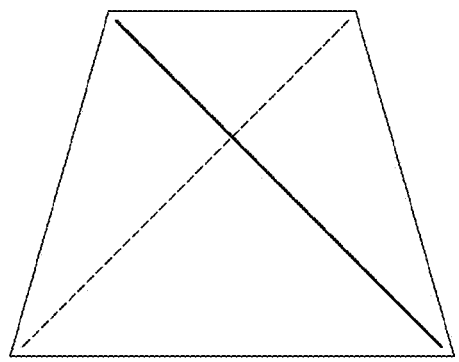
FIG. 4B a schematic view illustrating light transmission axes of the upper and lower polarizers, which are orthogonal to each other, when viewed in a diagonal direction.

Description will now be given in detail of preferred embodiments of an in-plane switching (IPS) mode liquid crystal display (LCD) device and display device according to the present invention, with reference to the accompanying drawings, such that those skilled in the art to which the present invention belongs can easily practice.

Advantages and features of the present invention and methods of achieving those will be obviously understood with reference to the accompanying drawings and exemplary embodiments to be explained later in detail. Exemplary embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. The same/like reference symbols refer to the same/like components throughout the specification. In the drawings, the thicknesses of layers and regions are exaggerated for clarity.

It will be understood that when an element is referred to as being "on" another element, the element can be located on the other element or intervening elements may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings. For example, if the device in the drawings is turned over, elements described as "below" or "beneath" other elements or features would then be oriented "above" the other elements or features. Thus, the exemplary term "below" can encompass both an orientation of above and below.

The terminology used herein is for the purpose of describing particular embodiments only and is not intended to be limiting of example embodiments. As used herein, the singular forms are intended to include the plural forms as well, unless the context clearly indicates otherwise. It will be further understood that the terms "comprises", "comprising", "includes" and/or "including," if used herein, specify the presence of stated steps, operations, elements and/or components, but do not preclude the presence or addition of one or more other features, integers, steps, operations, elements, components and/or groups thereof.

Figure 5:
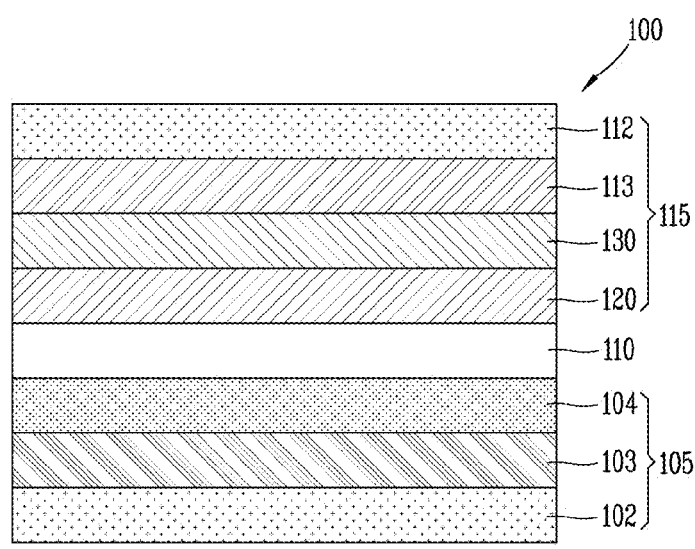
FIG. 5 is a sectional view exemplarily illustrating an IPS-mode LCD device in accordance with an example embodiment of the present invention.
Figure 6:
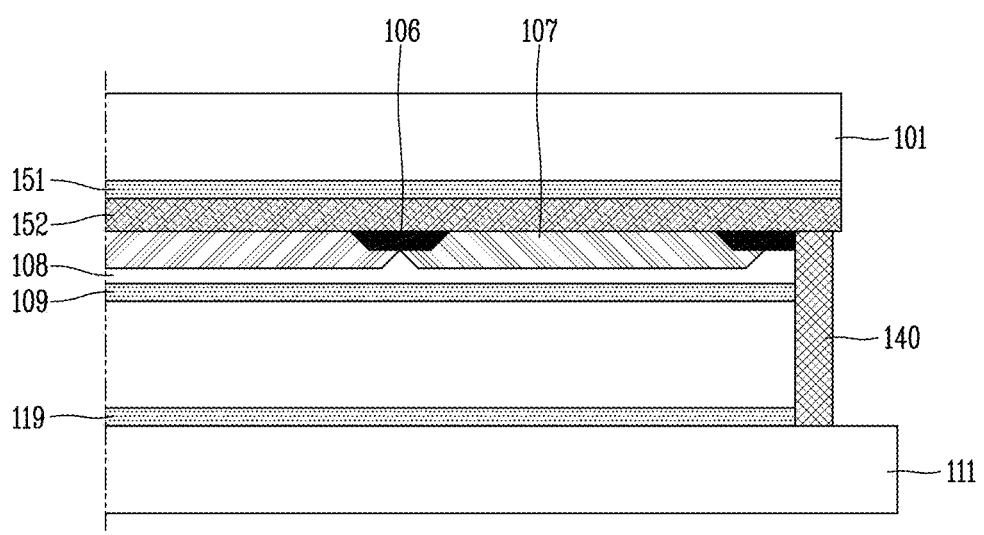
FIG. 6 is a sectional view schematically illustrating a structure of a liquid crystal display panel employing an in-cell retarder in the IPS-mode LCD device illustrated in FIG. 5 in accordance with the embodiment of the present invention.

FIG. 5 is a sectional view exemplarily illustrating an in-plane switching (IPS) mode LCD device in accordance with an example embodiment of the present invention. FIG. 6 is a sectional view schematically illustrating a structure of a liquid crystal display panel employing an in-cell retarder in the IPS-mode LCD device illustrated in FIG. 5 in accordance with the embodiment of the present invention.

FIGS. 5 and 6 show a liquid crystal display device as an example for a display device. However, the present invention may not be limited to the liquid crystal display device.

As illustrated in FIGS. 5 and 6, an IPS-mode LCD device 100 in accordance with an embodiment of the present invention may include a liquid crystal display panel 110 to output an image, a first polarizer 105 below the liquid crystal display panel 110, and a second polarizer 115 above the liquid crystal display panel 110.

Here, the liquid crystal display panel 110 includes a color filter substrate 101, an array substrate 111, and a liquid crystal layer (not illustrated) between the color filter substrate 101 and the array substrate 111.

The liquid crystal layer may include nematic liquid crystals which are homogeneously aligned while an electric field is not generated. The liquid crystal layer may exhibit a refractive index profile of $nx>ny=nz$ (here, the refractive indexes within a plane are referred to as nx and ny, and a refractive index in a thickness direction is referred to as nz). Here, in this specification, the case of $ny=nz$ includes both a case where ny and nz are completely the same as each other and a case where ny and nz are substantially the same as each other.

A driving mode using the liquid crystal layer having the refractive index profile may include, for example, an in-plane switching (IPS) mode, a fringe field switching (FFS) mode, or the like.

Here, the IPS mode is a mode of driving nematic liquid crystals, which are homogeneously aligned while an electric field is not present, by a horizontal electric field formed by pixel electrodes and common electrodes, using an electrically controlled birefringence (ECB) effect.

Also, the FFS mode is a mode of driving the liquid crystals according to substantially the same method as the IPS mode. Here, the horizontal electric field of the FFS mode is referred to as a fringe field. The fringe field may be formed by setting an interval between a pixel electrode and a common electrode, which are formed of a transparent conductive material, to be narrower than an interval between upper and lower substrates.

Here, the pixel electrode and the common electrode may have a straight (linear) shape or a zigzag shape. Or, one of the pixel electrode and the common electrode may have the straight shape and the other may have the zigzag shape. Or, one of the pixel electrode and the common electrode may have the straight or zigzag shape and the other may have a rectangular shape. That is, the present invention may not be limited to those shapes of the pixel electrode and the common electrode.

The pixel electrode and the common electrode may be formed of the transparent conductive material. Or, one of the pixel electrode and the common electrode may be formed of an opaque conductive material, for example, copper (Cu), Cu alloy or the like. That is, the present invention may not be limited to the material of forming the pixel electrode and the common electrode.

Here, the embodiment of the present invention illustrates an example of an IPS-mode LCD device. However, the present invention may not be limited to this, but also be applicable to an FFS mode, super-IPS-mode, or reverse TN IPS-mode LCD device.

The color filter substrate 101 includes a color filter 107 having a plurality of sub color filters for rendering red (R), green (G) and blue (B) colors, and a black matrix 106 partitioning the sub color filters and blocking light transmitted through the liquid crystal layer.

An overcoat layer 108 which is formed of an organic material may be formed on the color filter substrate 101 having the color filter 107 and the black matrix 106. The overcoat layer 108 may prevent a flow of dyes and planarize a surface of the color filter 107. Or, the color filter 107, the overcoat layer 108 and the black matrix 106 may be sequentially formed on the color filter substrate 101.

The color filter 107 and the black matrix 106 may be formed in a zigzag shape. That is, the present invention may not be limited to the shape of the color filter 107 and the black matrix 106.

Although not illustrated for the sake of explanation, the array substrate 111 may include a plurality of gate lines and data lines arranged horizontally and vertically to define a plurality of pixel regions, a TFT as a switching element formed on each intersection between the gate line and the data line, and a pixel electrode and a common electrode formed on each pixel region to generate a horizontal electric field.

The configured color filter substrate 101 and the array substrate 111 are assembled (or bonded) to each other in a facing manner, by use of a sealant 140 which is provided along an outer edge of an image display region, thereby configuring the liquid crystal display panel 110. Here, alignment layers 109 and 119 for alignment of the liquid crystal layer are provided on inner surfaces of the color filter substrate 101 and the array substrate 111, respectively.

Here, the liquid crystal display panel 110 according to the embodiment of the present invention includes an in-cell retarder 152 having a positive A-plate and between the color filter substrate 101 and the liquid crystal layer, to prevent a light leakage at a front direction. FIG. 6 exemplarily illustrates a case where the in-cell retarder 152 is formed on a lower layer of the color filter substrate 101, but the present invention may not be limited to this.

The in-cell retarder 152 may be located on an alignment layer 151. The in-cell retarder 152 according to the embodiment of the present invention may include a positive A-plate type of reactive mesogen (RM) whose retardation value is about 156±20 nm.

As aforementioned, the first polarizer 105 and the second polarizer 115 are attached onto lower and upper portions of the liquid crystal display panel 110, respectively.

The first polarizer 105 includes a first supporting body 102, a second supporting body 104, and a first polarizing element 103 between the first supporting body 102 and the second supporting body 104. The second polarizer 115 includes a third supporting body 112, first and second optical compensation films 120 and 130, and a second polarizing element 113 between the third supporting body 112 and the first and second optical compensation films 120 and 130.

Here, the first optical compensation film 120 and the second optical compensation film 130 may be sequentially on the liquid crystal display panel 110.

The first polarizing element 103 and the second polarizing element 113 may be formed of polyvinyl alcohol (PVA).

The first supporting body 102 and the third supporting body 112 may be formed of a protection film without retardation, for example, triacetylcellulose (TAC). Also, the second supporting body 104 may be formed of a protection film without retardation for protecting the PVA layer. For example, the second supporting body 104 may be formed of 0-RT (denoting a transformed TAC of which Rth is close to 0 nm, and also called 0-TAC) or cycloolefin polymer (COP).

The first polarizing element 103 and the second polarizing element 113 denote films which may convert natural light or polarized light into arbitrary polarized light. Here, the first polarizing element 103 and the second polarizing element 113 may have the function of transmitting one polarization component when dividing incident light into two orthogonal polarization components, and of absorbing, reflecting and/or scattering the other polarization component.

Although there is no limit to an optical film used for the first polarizing element 103 and the second polarizing element 113, examples of such optical film may include a polymer-stretched film having as a main component a PVA-based resin having iodine or dichroic dye, an O-type polarizing element in which liquid crystalline composition having a dichromatic material and liquid crystalline compound is aligned in a predetermined direction, an E-type polarizing element in which lyotropic liquid crystal is aligned in a predetermined direction, and the like.

Here, an absorption axis of the first polarizing element 103 is substantially orthogonal to an absorption axis of the second polarizing element 113. Here, an optical axis of the liquid crystal layer is parallel to the light absorption axis of the first polarizing element 103. On the other hand, as aforementioned, when the first polarizer 105 is located above the liquid crystal display panel 110 and the second polarizer 115 is located below the liquid crystal display panel 110, the optical axis of the liquid crystal layer is parallel to the absorption axis of the second polarizing element 113.

Here, to improve the viewing angle characteristic when viewing the LCD device in the diagonal direction in the present invention, the first optical compensation film 120 and the second optical compensation film 130 are disposed between the second polarizing element 113 and the liquid crystal display panel 110. Here, the first optical compensation film 120 includes a positive biaxial film, and the second optical compensation film 130 includes a negative biaxial film.

Hereinafter, description will be given in detail of the positive biaxial film and the negative biaxial film as the first optical compensation film 120 and the second optical compensation film 130, with reference to the accompanying drawings.

Figure 7A:
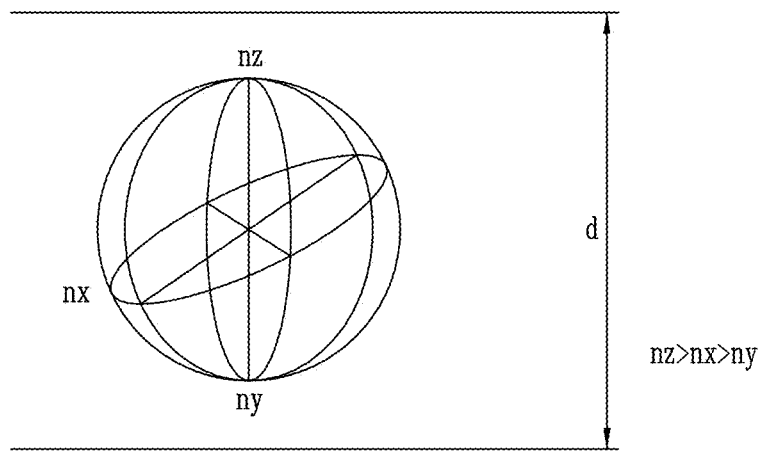
FIGS. 7A and 7B are views illustrating a positive biaxial film and a negative biaxial film as optical compensation films in an IPS-mode LCD device in accordance with an embodiment of the present invention.
Figure 7B:
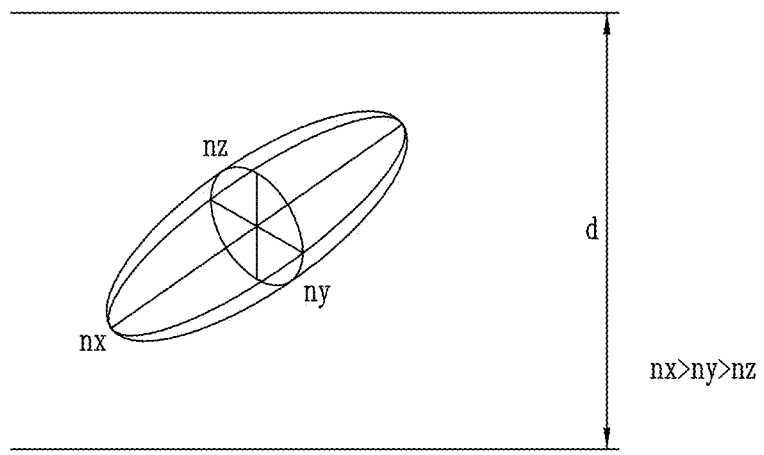

FIGS. 7A and 7B are views illustrating a positive biaxial film and a negative biaxial film which are used as optical compensation films in an IPS-mode LCD device in accordance with an embodiment of the present invention. That is, FIGS. 7A and 7B are views illustrating refractive indexes with respect to the positive biaxial film and the negative biaxial film, respectively.

Retardation films are classified into a uniaxial film and a biaxial film according to the number of optical axes, and also classified into a positive film and a negative film according to a difference between a refractive index in an optical axis direction and refractive indexes in the other directions. For example, the retardation film is classified into a uniaxial film when there is a single optical axis, and into a biaxial film when there are two optical axes. And, the retardation film is classified into the positive film when the refractive index in the direction of the optical axis is greater than the refractive indexes in the other directions, and into the negative film when the refractive index in the direction of the optical axis is smaller than the refractive indexes in the other directions.

The retardation film may be expressed by the refractive index in each direction in a xyz coordinate system. For example, when the retardation film is located on a xy plane, the x and y axes denote in-plane directions of the retardation film, and the retardation film has refractive indexes nx, ny and nz according to the x, y and z axes.

Here, Re (or Rin) refers to an in-plane retardation value (or an in-plane phase difference or retardation) and Rth refers to a thickness-direction retardation value (or a phase difference or retardation in a thickness direction). Also, Nz refers to an index indicating an extent of biaxiality of the retardation film. This can be defined according to Equation 1 as follows.

$$Re=(nx-ny)\cdot d$$

$$Rth=(nx-nz)\cdot d$$

$$Nz=Rth/Re \quad \text{[Equation 1]}$$

Here, d denotes a thickness of a film.

The positive biaxial film (or +B plate), which is an optical film having Nz smaller than 0, has a relation of nz>nx>ny and thus its optical axis is located between nz and ny.

Also, the negative biaxial film (or −B plate), which is an optical film having Nz greater than 1.0, has a relation of nx>ny>nz and thus its optical axis is located between nz and nx.

Here, examples of films which can be used as the positive biaxial film and the negative biaxial film may include a uniaxially-stretched TAC, a uniaxially-stretched polynorborene (PNB), a biaxially-stretched polycarbonate (PC), a biaxially-stretched COP, a biaxial LC film and the like.

The first optical compensation film 120 and the second optical compensation film 130 according to the first embodiment having such optical conditions compensate for the broken orthogonality of the first and second polarizers 105 and 115 in the diagonal direction, thereby reducing the light leakage in the diagonal direction. This will be explained in detail using the Poincare sphere.

The Poincare sphere in a polarized state is used in order to geometrically analyze an optical characteristic of a transparent medium.

First of all, the Jones vector can merely exhibit a complete polarization. In order to exhibit more general partial polarization, Stokes parameters which are defined according to the following Equation 2 are used.

$$S_0=<|E_x|^2>+<|E_y|^2>$$

$$S_1=<|E_x|^2>-<|E_y|^2>$$

$$S_2=2|E_x||E_y|<\cos(\phi_x-\phi_y)>$$

$$S_3=2|E_x||E_y|<\sin(\phi_x-\phi_y)> \quad \text{[Equation 2]}$$

Here, < > denotes time average. An inequality of $S_0^2 \geq S_1^2 + S_2^2 + S_3^2$ is established among those four variables, and an equality thereof is satisfied only for a complete polarization.

For the complete polarization, Equation 3 is established among standardized variables $s_1$, $s_2$ and $s_3$ which are obtained by dividing $S_1$, $S_2$ and $S_3$ by light brightness $S_0$.

$$s_1^2+s_2^2+s_3^2=1 \quad \text{[Equation 3]}$$

This is an equation of the Poincare sphere having a radius of 1 in a three-dimensional space. Here, $(s_1, s_2, s_3)$ denote points of orthogonal coordinates of the Poincare sphere.

Here, in the Poincare sphere, all points on the equator correspond to (represent) linear polarization. The arctic corresponds to right-handed circular polarization and the Antarctic corresponds to left-handed circular polarization. Also, all points of the Northern hemisphere correspond to right-handed elliptical polarization, and all points of the Southern hemisphere correspond to left-handed elliptical polarization.

Figure 8A:
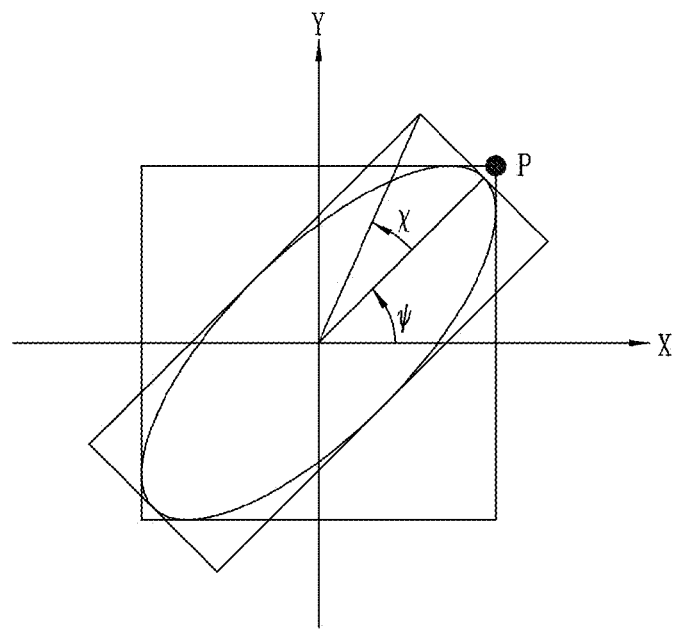
FIGS. 8A and 8B are views illustrating an arbitrary elliptical polarization in an orthogonal coordinate system and a corresponding Poincare vector.
Figure 8B:
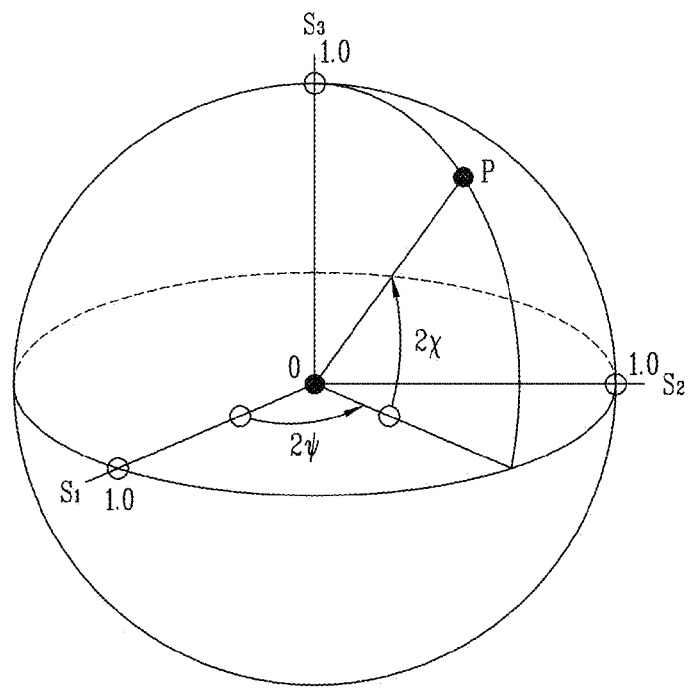

FIGS. 8A and 8B are views each illustrating an arbitrary elliptical polarization in an orthogonal coordinate system and a corresponding Poincare vector.

As illustrated in FIGS. 8A and 8B, for the Poincare vector P, corresponding to an elliptical polarization in which an azimuthal angle of a long axis thereof is ψ and an elliptical angle is x, a latitude angle is 2x, an azimuthal angle is 2ψ and orthogonal coordinates are (cons(2ψ)cons(2x), sin(2ψ)cos(2x), sin(2x)). If this point is located on the Northern hemisphere, an electric field vector is rotated in a clockwise direction, and if the point is located on the Southern hemisphere, the electric field vector is rotated in a counterclockwise direction. Here, antipodes on the Poincare sphere represent an orthogonally polarized state.

Further, the unitary Jones matrix representing the change in the polarized state when light passes through a transparent medium can be analyzed by a rotation conversion on the Poincare sphere.

Figure 9:
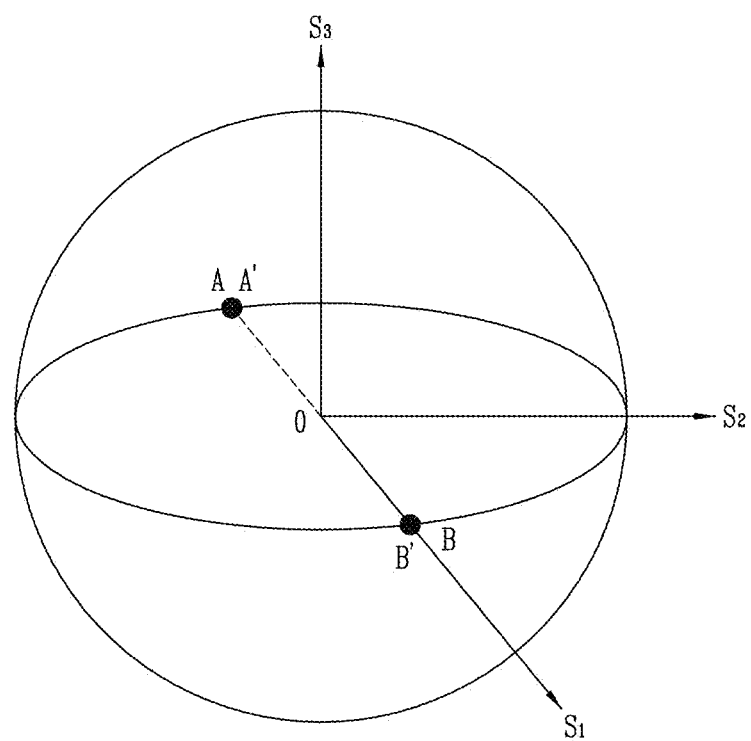
FIG. 9 is a view illustrating the Poincare sphere representing a polarized state of light passed through each optical element when viewing the IPS-mode LCD device from a front direction.

FIG. 9 is a view illustrating the Poincare sphere representing a polarized state of light passed through each optical element when viewing the IPS-mode LCD device from a front side.

Figure 10A:
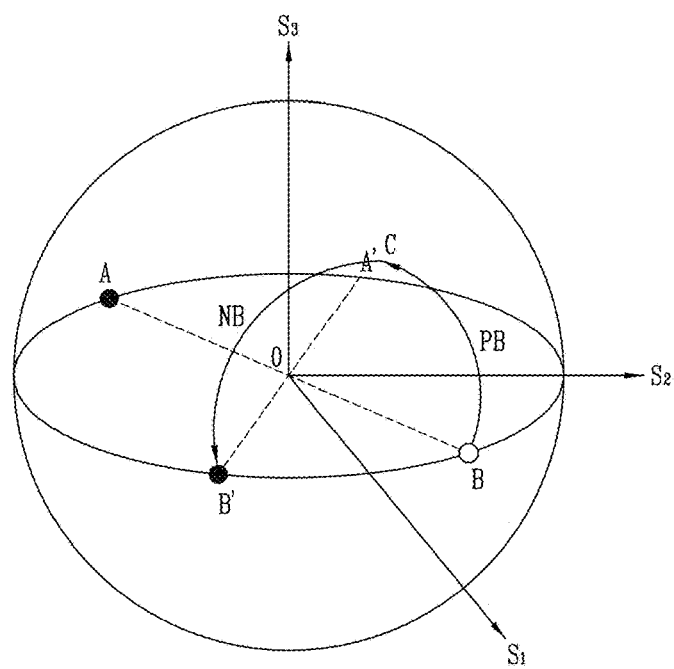
FIGS. 10A and 10B are views each illustrating the Poincare sphere representing a polarized state of light passed through each optical element when viewing the IPS-mode LCD device in a diagonal direction.
Figure 10B:
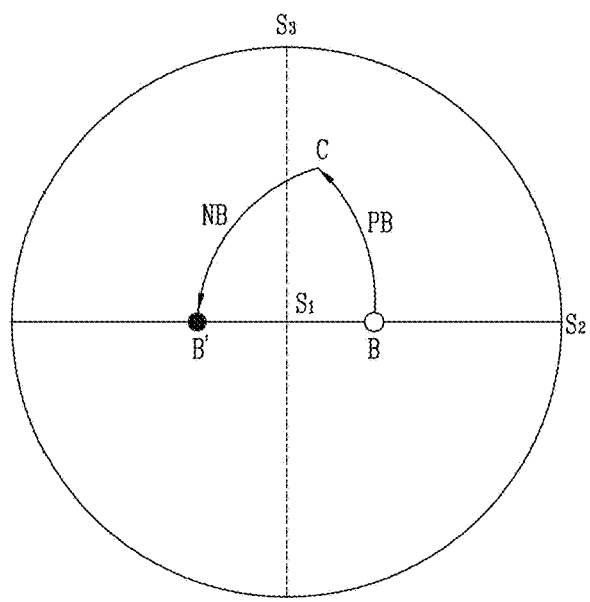

FIGS. 10A and 10B are views each illustrating the Poincare sphere representing a polarized state of light passed through each optical element when viewing the IPS-mode LCD device in a diagonal direction.

Here, FIG. 10B is a two-dimensional view illustrating a compensation mechanism for a path of light using the Poincare sphere illustrated in FIG. 10A. That is, FIG. 10B is a view illustrating the Poincare sphere illustrated in FIG. 10A when viewing the Poincare sphere from a front side. Although FIG. 10B in the two-dimensional expression illustrates displacement of points before and after a change in the polarized state using arrows, any change in the polarized state of light can be expressed on the Poincare sphere by a rotation by a specific angle around a specific axis, which is determined corresponding to each optical characteristic.

Here, as aforementioned, the Poincare sphere represents all of polarized states of light on a spherical plane. Therefore, the polarized state can be easily predicted by using the Poincare sphere if an optical axis of an optical element and a retardation value are known.

In the Poincare sphere, all points on the equator represent linear polarization. The arctic $S_3$ corresponds to right-handed circular polarization and the Antarctic $-S_3$ corresponds to left-handed circular polarization. Also, all points of the Northern hemisphere of the other region correspond to right-handed elliptical polarization, and all points of the Southern hemisphere correspond to left-handed elliptical polarization.

Here, referring to FIG. 9, point A and point A' refer to an absorption axis of the lower polarizer and a transmission axis of the upper polarizer when viewing the LCD device from the front direction. Point B and point B' refer to a transmission axis of the lower polarizer and an absorption axis of the upper polarizer. The polarized states of the upper and lower polarizers are symmetrical to a center 0 of the Poincare sphere and thus perpendicular to each other, thereby realizing a black (or dark) state. That is, as aforementioned, the antipodal points A and B' on the Poincare sphere represent orthogonally-polarized states.

However, referring to FIGS. 10A and 10B, when viewing the LCD device in the diagonal direction, the transmission axis A' of the upper polarizer and the transmission axis B of the lower polarizer are shifted toward $S_2$ axis by a predetermined distance, and the absorption axis B' of the upper polarizer and the absorption axis A of the lower polarizer are shifted toward $-S_2$ axis by a predetermined distance. Here, since the point A and the point B' are not symmetrical to the center 0, the polarized states of the upper and lower polarizers are not perpendicular to each other.

Therefore, the optical compensation films according to the embodiment disclosed herein can be used such that the optical axis of light incident on the upper polarizer can match the absorption axis of the upper polarizer. Here, the polarized state of incident light transmitted through the lower polarizer corresponds to the point B, and the polarized state of light which has been absorbed by the absorption axis of the upper polarizer corresponds to the point B'.

That is, when incident light is transmitted through the lower polarizer of which absorption axis is at the point A on the Poincare sphere, the light is linearly polarized and thus is present at the point B. The linearly-polarized light is transmitted through the homogeneous liquid crystal layer. Since the alignment direction of the liquid crystal layer is orthogonal to the polarization direction of the linearly-polarized light, the linearly-polarized light is not changed in phase within the liquid crystal layer. Therefore, light transmitted through the liquid crystal layer is maintained in the same linearly-polarized state, thereby having the polarized state corresponding to the point B.

In this manner, in the IPS-mode LCD device, the light leakage which is caused due to the polarized state being out of the axis in the diagonal direction results from the non-match of the polarized states between the points B and B'. Therefore, the optical compensation films of the present invention are used to cause the change in the polarized state of the incident light from the point B to the point B' as well as the change in the polarized state of the liquid crystal layer.

Thus, when viewing the IPS-mode LCD device according to the embodiment of the present invention in the diagonal direction, the polarized state of light transmitted through each optical element is represented as follows.

First, a polarized state of light is rotated from point B to point C when the light is transmitted through the positive biaxial film as the first optical compensation film, and then rotated from the point C to point B' when the light is transmitted through the negative biaxial film as the second optical compensation film. Therefore, the polarized state (point B') of the light incident on the upper polarizer becomes consistent with the absorption axis of the upper polarizer, and accordingly the light is absorbed, thereby realizing an excellent black state.

In detail, when non-polarized light is incident on a first polarizer from a backlight of the LCD device, the light is linearly polarized. Most of the linearly-polarized light is absorbed at the absorption axis (point A) of the first polarizer and the polarized state of the light transmitted through the first polarizer is located at point B. That is, the transmission axis of the first polarizer is located at point B. Here, the absorption axis of the second polarizer is located at point B' so as to be spaced apart from the transmission axis of the first polarizer by a distance.

When the light linearly polarized by the first polarizer is transmitted through the positive biaxial film of which optical axis is located at a predetermined region between nz and ny, the polarized state of the light is rotated in a counterclockwise direction around the optical axis of the positive biaxial film so as to be moved from point B to point C.

That is, the linearly-polarized light is rotated in the counterclockwise direction around the optical axis of the positive biaxial direction by $2\pi$ times of a value, which is obtained by dividing an available retardation value of the positive biaxial film by green wavelength (550 nm), which affects brightness. Accordingly, the linearly-polarized light is changed into elliptically-polarized light at the point C. The elliptically-polarized light is then incident on the negative biaxial film as the second optical compensation film.

When the elliptically-polarized light by the positive biaxial film is transmitted through the negative biaxial film located at a predetermined region between nz and nx, the polarized state of the light is rotated in a counterclockwise direction around the optical axis of the negative biaxial film. The polarized state of the light is then moved from point C to point B'.

That is, the elliptically-polarized light is rotated in the counterclockwise direction around the optical axis of the positive biaxial direction by $2\pi$ times of a value, which is obtained by dividing an available retardation value of the negative biaxial film by the green wavelength (550 nm). Accordingly, the elliptically-polarized light is changed into linearly-polarized light at point B'. Here, since the point B' indicates the absorption axis of the upper polarizer, the incident light is completely absorbed by the upper polarizer, so as to implement an excellent black state.

In this manner, in the embodiment of the present invention, the polarized state of light may be adjusted using the positive biaxial film and the negative biaxial film, to prevent the light leakage in the diagonal direction, thereby preventing the contrast ratio from being lowered.

Meanwhile, as aforementioned, even when viewing the liquid crystal display panel from the front direction, the light leakage is caused due to external stress applied to the liquid crystal display panel. This results from that a glass substrate obtains refractive anisotropy due to interference between a structure and the liquid crystal display panel and stress applied during an array process and a color filter process.

Figure 11:
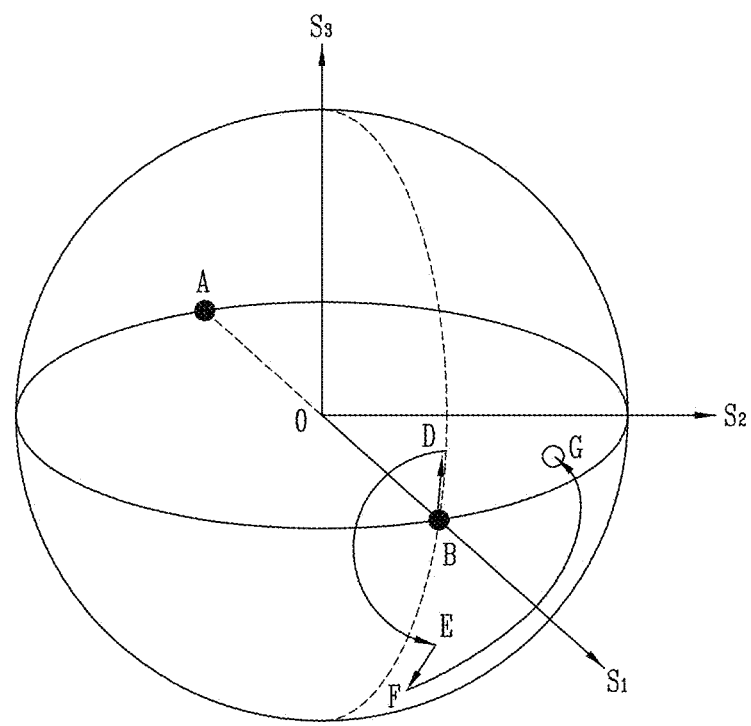
FIG. 11 is a view illustrating the Poincare sphere representing a light leakage caused due to external stress.

FIG. 11 is a view illustrating the Poincare sphere representing a light leakage caused due to external stress.

As illustrated in FIG. 11, when viewing an IPS-mode LCD device without employing an in-cell retarder from a front direction, the polarized state of light transmitted through each optical element is represented as follows.

First, light is moved from point B to point D when transmitted through a lower glass substrate (namely, the array substrate). This is caused due to the refractive anisotropy of the glass substrate due to external stress. Such retardation value (~10 nm) of the glass substrate makes the light path moved from point B to point D.

Afterwards, the light is moved from the point D to point E by the liquid crystal layer having a retardation value in the range of 280 to 350 nm, and then moved from the point E to point F by an upper glass substrate (namely, the color filter substrate).

Here, since the liquid crystal layer has the retardation value of 280 to 350 nm but its alignment direction is perpendicular to a polarization direction of light, which has been linearly polarized at the lower polarizer, the linearly-polarized light is not changed in phase within the liquid crystal layer. However, when the glass substrates has the refractive anisotropy, the light linearly polarized at the lower polarizer is changed into elliptically-polarized light (to be then moved to point D) due to the retardation value of the glass substrate prior to reaching the liquid crystal layer. And, light transmitted through the liquid crystal layer is then elliptically polarized by the retardation value of the liquid crystal layer, and thereafter moved to the point E.

The light is moved from point F to point G when transmitted through the positive biaxial film and the negative biaxial film as the optical compensation films. Hence, the polarized state of the light arrived at the upper polarizer is not consistent with (or does not match) the absorption axis (point B) of the upper polarizer, which causes the light leakage.

Figure 12A:
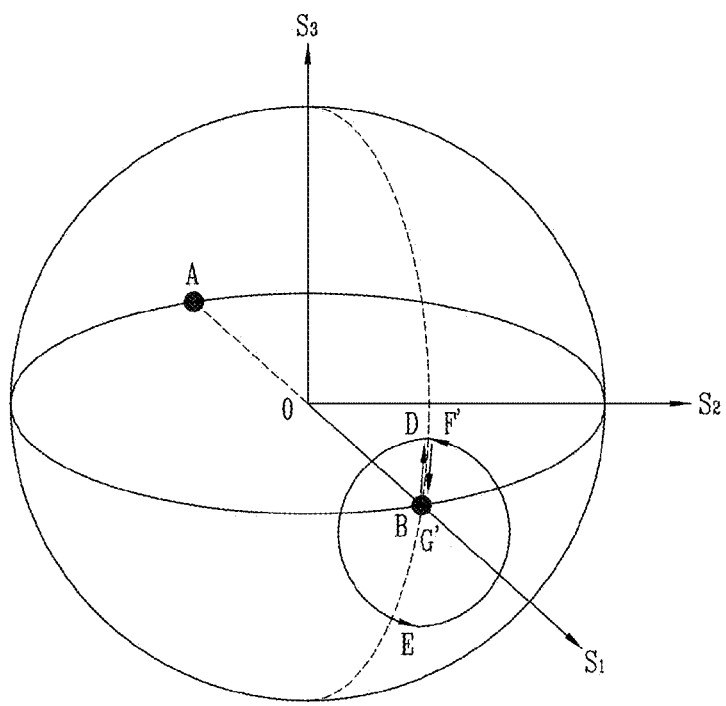
FIGS. 12A and 12B are views illustrating the Poincare sphere representing a reduced state of a light leakage by applying an in-cell retarder in accordance with an embodiment of the present invention.
Figure 12B:
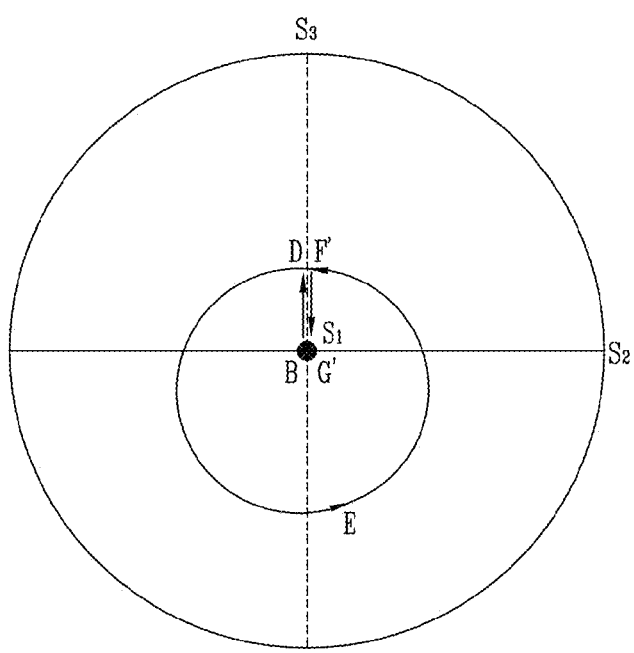

FIGS. 12A and 12B are views illustrating the Poincare sphere representing a reduced light leakage by applying an in-cell retarder in accordance with an embodiment of the present invention.

Here, FIG. 12B is a two-dimensional view illustrating a compensation mechanism for a path of light using the Poincare sphere illustrated in FIG. 12A.

As illustrated in FIGS. 12A and 12B, when viewing an IPS-mode LCD device with an in-cell retarder according to an embodiment of the present invention in a front direction, the polarized state of light transmitted through each optical element is represented as follows.

First, when light is transmitted through the lower glass substrate (namely, array substrate), its path is moved from point B to point D.

Afterwards, as aforementioned, the light is moved from the point D to point E by the liquid crystal layer having the retardation value of 280 to 350 nm.

Then, the light is moved from the point E to point F' (=point D) by the in-cell retarder according to the embodiment, and then moved from the point F' to point G' (=point B) by the upper glass substrate (namely, color filter substrate).

Here, the in-cell retarder is formed of RM (Reactive Mesogen) of a positive A plate type whose retardation value is about 156±20 nm.

When the elliptically-polarized light by the liquid crystal layer is transmitted through the positive A plate of which optical axis is located at a predetermined region of nx, the polarized state of the light is rotated in a counterclockwise direction around the optical axis of the positive A plate. Accordingly, the polarized state of the light is moved from the point E to the point F'.

That is, the elliptically-polarized light by the liquid crystal layer is rotated in the counterclockwise direction around the optical axis of the positive A plate by $2\pi$ times of a value, which is obtained by dividing an available retardation value of the positive A plate by the green wavelength (550 nm), thereby being moved to the point F'.

The light moved to the point G' (=point B) by the upper glass substrate is finally moved to point B, with maintaining the polarized state, when transmitted through the positive biaxial film and the negative biaxial film as the optical compensation films. Therefore, the incident light is completely absorbed at the upper polarizer, thereby exhibiting an excellent black state in the front direction.

According to the present invention, the path of light deviated (changed) due to the glass substrate can be compensated for by the in-cell retarder, such that the light can have the same path of light as that when the glass substrate is isotropic.

Figure 13:
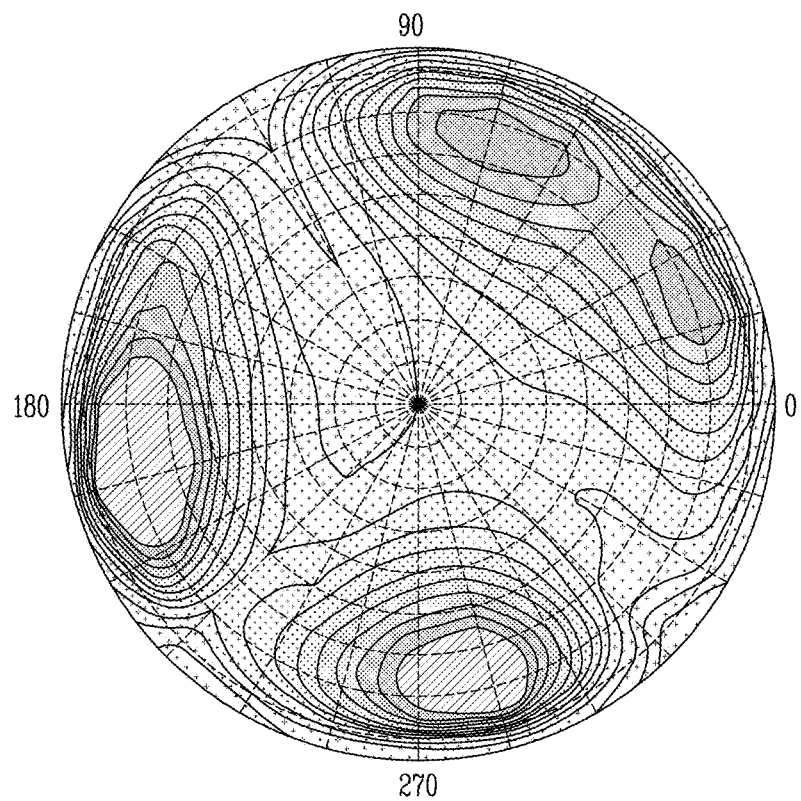
FIG. 13 is an exemplary view illustrating a simulation result of brightness and viewing angle characteristics in a black (or dark) state in an IPS-mode LCD device in accordance with an embodiment of the present invention.

FIG. 13 is an exemplary view illustrating simulation results of brightness and viewing angle characteristics in a black state, in an IPS-mode LCD device in accordance with an embodiment of the present invention. Here, the lower polarizer and the upper polarizer are arranged such that their optical absorption axes are orthogonal to each other and the optical axis of the liquid crystal layer is parallel to the optical absorption axis of the lower polarizer.

Figure 14A:
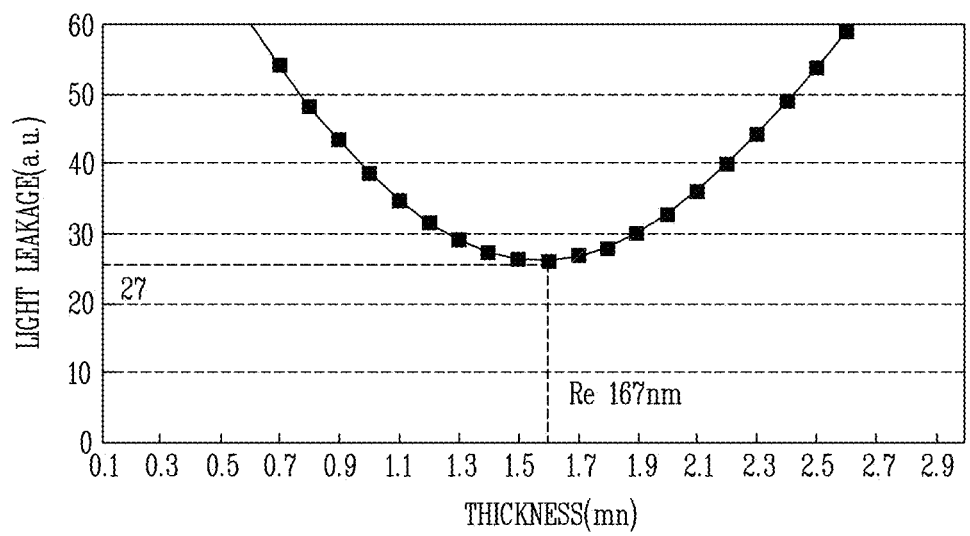
FIGS. 14A and 14B are graphs illustrating a light leakage according to a thickness of an in-cell retarder when the IPS-mode LCD device is viewed in front and diagonal directions.
Figure 14B:
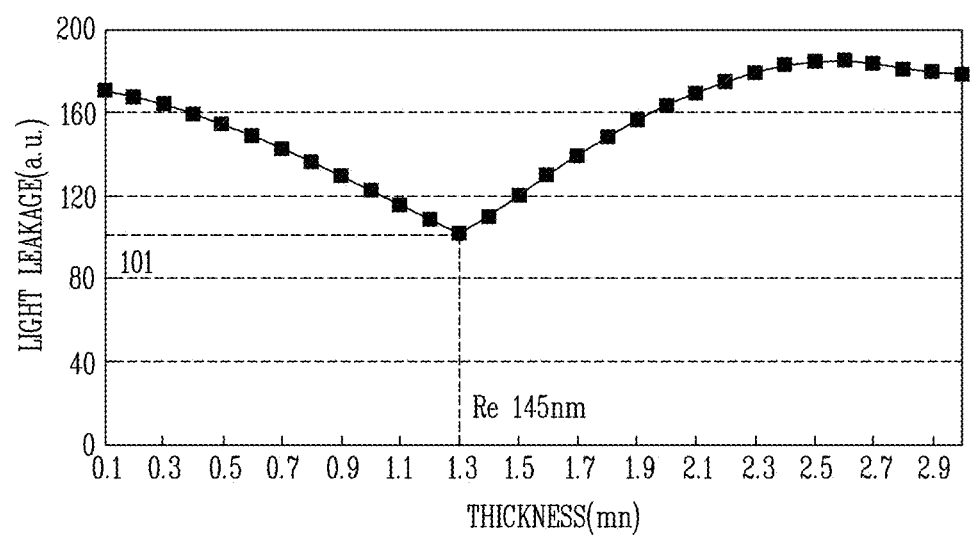

FIGS. 14A and 14B are graphs illustrating a light leakage according to a thickness of an in-cell retarder when the liquid crystal display panel is viewed in front and diagonal directions.

As illustrated in FIGS. 13, 14A and 14B, the retardation value of the in-cell retarder may be adjusted 156 nm according to light leakage simulation results.

The retardation value is a retardation value having the minimum light leakage in the front and diagonal directions. It may be noticed that the minimum light leakage is observed at the retardation value of 167 nm in the front direction, and at the retardation value of 145 nm in the diagonal direction.

Here, it can be understood that the light leakage is reduced by about 73% in the front direction and about 34% in the diagonal direction, as compared with a case without the in-cell retarder.

Figure 15A:
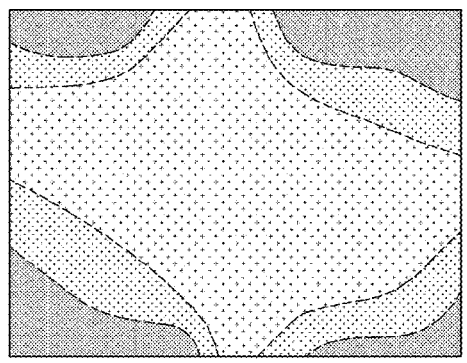
FIGS. 15A, 15B and 15C are exemplary views illustrating the light according to a retardation value of the in-cell retarder.
Figure 15B:
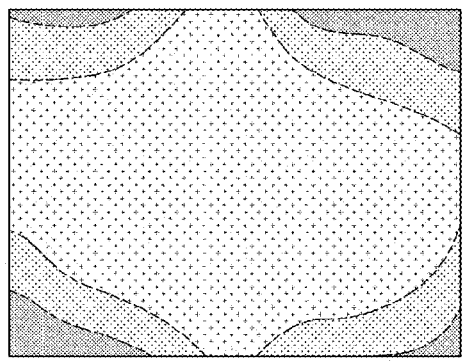
Figure 15C:
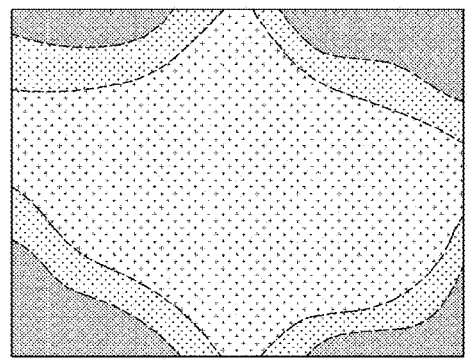

FIGS. 15A, 5B and 15C are exemplary views illustrating the light according to a retardation value of the in-cell retarder.

Here, FIGS. 15A, 5B and 15C show the amount of the light leakage at the retardation value of 120 nm, 150 nm and 220 nm, respectively. Moreover, in FIGS. 15A, 5B and 15C, the amount of the light leakage may be proportional to the density of the dot used in the hatching.

Referring to FIGS. 15A, 5B and 15C, it can be understood that the minimum light leakage is observed at the retardation value of 150 nm. In case, it can be understood that the light leakage is reduced by about 56%, as compared with above simulation results. That is, it can be understood that the area having the higher density of the dot is minimized at the retardation value of 150 nm. Thus, the light leakage is minimized.

In accordance with one example embodiment of the present invention as described herein, an in-plane switching (IPS) mode LCD device and display device can compensate for a path of light by employing an in-cell retarder having a positive A-plate. Accordingly, the light leakage in a front direction, caused due to external stress, can be reduced by 73% or more, thereby improving image quality. It will be apparent to those skilled in the art that various modifications and variations can be made in the in-plane switching (IPS) mode LCD device and display device of the present invention without departing from the spirit or scope of the invention. Thus, it is intended that the present invention cover the modifications and variations of this invention provided they come within the scope of the appended claims and their equivalents.

What is claimed is:

1. An in-plane switching (IPS) mode liquid crystal display (LCD) device, comprising:
    a liquid crystal display panel having a first substrate, a second substrate, and a liquid crystal layer between the a first and second substrates;
    a second polarizer on an outer surface of the second substrate, the second polarizer having a second polarizing element;
    an in-cell retarder on an inner surface of the second substrate, wherein the in-cell retarder compensates a light leakage in a front direction normal to the front surface of the liquid crystal display panel;
    an alignment layer directly on an inner surface of the second substrate, the in-cell retarder being directly on the alignment layer; and
    a first optical compensation film and a second optical compensation film between the second substrate and the second polarizing element,
    wherein the first optical compensation film directly contacts the second substrate and includes a positive biaxial film having nz>nx>ny,
    wherein nx, ny, nz are respective x-direction, y-direction, and z-direction refractive indexes in an x, y, z coordinate system, and
    wherein the second optical compensation film directly contacts the first optical compensation film and includes a negative biaxial film having nx>ny>nz.

2. The device of claim 1, further comprising a first polarizer on an outer surface of the first substrate, the first polarizer having a first polarizing element.

3. The device of claim 2, wherein an absorption axis of the first polarizing element and an absorption axis of the second polarizing element are perpendicular to each other.

4. The device of claim 2, wherein an optical axis of the liquid crystal layer, when no electric field is applied, is parallel to the absorption axis of the first polarizing element.

5. The device of claim 1, wherein the first substrate includes an array substrate, and the second substrate includes a color filter substrate.

6. The device of claim 1, wherein the negative biaxial film is between the positive biaxial film and the second polarizing element.

7. The device of claim 1, wherein the second optical compensation film is arranged between the first optical compensation film and the second polarizing element.

8. The device of claim 1, wherein an absorption axis of the second polarizing element is parallel to a polarized state of light transmitted through first and second optical compensation films via the first substrate, the liquid crystal layer, the in-cell retarder and the second substrate in the direction normal to the front surface of the liquid crystal display panel.

9. The device of claim 1, wherein an absorption axis of the second polarization element is parallel to a polarized state of light transmitted through the first optical compensation film and the second optical compensation film in a direction oblique to the front surface of the liquid crystal display panel.

10. The device of claim 1, further comprising a black matrix and a color filter on the in-cell retarder.

11. The device of claim 1, wherein the in-cell retarder includes a reactive mesogen of a positive A-plate having a retardation value of 156±20 nm.

12. The device of claim 1, wherein the in-cell retarder has a retardation value of 156±20 nm.

13. The device of claim 1, wherein the second polarizer includes further a supporting body formed of a protection film without retardation properties.

14. The device of claim 1, wherein light transmitted through first and second optical compensation films, via the first substrate, the liquid crystal layer, the in-cell retarder and the second substrate, has a polarized state corresponding to the absorption axis of the second polarizing element, when viewing the liquid crystal display panel from the direction normal to the front surface of the liquid crystal display panel.

15. The device of claim 1, wherein a polarization state of light of the second polarizing element is parallel to an absorption axis of the second polarization element by the first optical compensation film and the second optical compensation film, when viewing the liquid crystal display panel in a direction oblique to the front surface of the liquid crystal display panel.

16. The device of claim 1, wherein the in-cell retarder compensates a light leakage in a direction oblique to the front surface of the liquid crystal display panel.

17. The device of claim 1, wherein the in-cell retarder compensates a light leakage due to an external stress applied to the at least one among the first substrate and the second substrate in the direction normal to the front surface of the liquid crystal display panel or in a direction oblique to the front surface of the liquid crystal display panel.

18. The device of claim 2, wherein the first polarizing element and the second polarizing element are formed of polyvinyl alcohol.

* * * * *